United States Patent Office 2,786,778
Patented Mar. 26, 1957

2,786,778

INK-RECEPTIVE RESINOUS FILMS

Philip V. Palmquist, New Canada Township, Ramsey County, Minn., assignor to Minnesota Mining & Manufacturing Company, St. Paul, Minn., a corporation of Delaware No Drawing. Application February 5, 1954,
Serial No. 408,595

8 Claims. (Cl. 117—12)

This invention relates to the surface treatment of thin flexible organic polymer films and to products produced thereby. A specific aspect of the invention concerns the formation of an ink-receptive surface on thin flexible transparent polyester films which normally are non-receptive of inks, adhesives, and analogous coatings.

An organic polymer film which is finding increasingly extensive application as a strong, tough, moisture-resistant, protective covering or wrapping material is "Mylar" polyester film, made from a polymeric condensation product of terephthalic acid and ethylene glycol. The film has exceptionally high tensile strength. It is tough, and resists bending and folding. The chemical resistance of the film is high, and it is weather-resistant and waterproof. However the film is non-receptive of printing inks as ordinarily employed in printing and decorating many types of transparent films. Normally tacky and pressure-sensitive adhesives, heat-activated and solvent-activated adhesive cements, and many other normally adherent coating materials, likewise do not adhere to such films with sufficient strength for many purposes. Other films and film-forming materials are known which are similarly ineffective in printing and bonding operations, although "Mylar" polyester film has been found unusually troublesome in this respect.

One of the primary objects of the present invention, therefore, is the development of means for imparting altered surface properties to "Mylar" and other film products, so as to improve the receptivity of such film surfaces toward printing inks and other adhesive and coating compositions. An ancillary object is the provision, from polymeric organic films having a normally non-ink-receptive surface, of treated film products which are highly ink-receptive and can be provided with permanent and well-bonded printed markings or analogous coatings of other adherent coating materials.

These and other objects and advantages are obtained by subjecting the polymeric organic film to the action of certain inorganic materials in vapor state, all in accordance with methods and principles which will be more specifically set forth by means of illustrative but non-limitative examples.

One particularly desirable product incorporating an ink-receptive treated "Mylar" film component prepared in accordance with the principles of this invention is a metallic-appearing protective film that looks like chrome plating, which is adherently attachable to metal, wood, glass, fabric, and other surfaces, and which is printable on the treated exposed outer "Mylar" film surface. In making this product, a thin, transparent, and normally non-ink-receptive "Mylar" film is first coated on one surface with a reflective coating of aluminum applied by vapor deposition in a high vacuum. The amount of aluminum applied is just sufficient to provide an opaque reflective coating that resembles chrome plating when viewed through the film. The reverse side of the "Mylar" film is then given an extremely light application of silicon monoxide (SiO) under similar conditions, i. e. in vapor form and under high vacuum. The film is next coated, over the aluminum coating, with a thin layer of an adhesive composition consisting essentially of a blend of rubbery butadiene-acrylonitrile polymer, a heat-advancing phenol-formaldehyde resin compatible therewith, and additional tackifier resins, pigments, and plasticizers as desired for specific adhesion properties, the whole being dispersed or dissolved in methyl ethyl ketone solvent. The adhesive may be coated directly on to the aluminum coated surface and then dried, or may alternatively be first coated on a temporary carrier web, dried, and then re-activated by moistening with methyl ethyl ketone and transferred to the aluminum coated surface of the treated "Mylar" film.

The "Mylar" film by itself cannot effectively be printed or decorated with inks such as are used in screen process printing or the like. When such inks are applied to the untreated film surface and dried, it is found that the ink film is readily removed by stripping with an adhesively attached section of pressure-sensitive adhesive tape. On the contrary, screen process inks applied to the treated surface of the "Mylar" film and dried thereon are found to be firmly bonded, and these functional coatings cannot be removed either by stripping with pressure-sensitive adhesive tape or by normal folding, crumpling or handling of the film product.

The product as above made exhibits a shiny chrome-plate appearance due to optical illusion resulting from the combination of the thin deposit of aluminum beneath the fully transparent "Mylar" film. The latter also serves to support and to protect the aluminum deposit. The treatment with the silicon monoxide provides an outer surface which, while being highly receptive of screen process inks, is still completely transparent so that the metallic background remains visible. The treatment does not visibly alter the film surface. The treatment is weather resistant, and exposure to water or moisture does not adversely affect the strong bond between the treated surface of the film and the decorative markings applied thereto.

Transparent film suitable for the wrapping of packages and the like, and which is receptive of ink markings as well as of adhesive sealing tapes, is prepared by treating the clear transparent "Mylar" film on one or both surfaces with silicon monoxide applied in vapor form and under high vacuum as in the preceding example. A specific application involves extending the film in a vacuum chamber at a distance of about 5–10 inches from a graphite crucible which may be electrically heated and which contains the silicon monoxide, reducing the pressure in the chamber to not more than about three microns, and then heating the crucible and vaporizing a portion of the silicon monoxide, and exposing the film to the vapor for about ¼–½ second. The resulting application of vapor to film is so slight as to be entirely invisible and defies determination by simple optical or analytical methods. The reverse side of the film is then separately treated in the same manner. The graphite crucible has the following dimensions: 2½ inches outside diameter, 1½ inches inside diameter, 1¾ inches in length, and bored to a depth of one inch. The crucible is heated to approximately 1300–1400° C. in order to volatilize the silicon monoxide. Induction heating is ordinarily the most suitable for this purpose.

A continuous process for treating the film has also been effectively employed. In this process the film is drawn over a polished metal surface which may be either a stationary plate or a rotatable drum. The metal surface is suitably cooled to prevent overheating due to the radiation from the crucible. The film is drawn over the metal surface and past the continuously heated crucible at a distance of about 5-10 inches and at a controlled rate. Exposure times of less than 1/40 second to more than 1/2 second have been found effective; most satisfactory results have been obtained where the time of exposure of the film to the vapor is about 1/4-1/2 second.

The treatment has been successfully carried out at pressures in the neighborhood of 3 microns of mercury, but improved results are obtained when operating under a vacuum of not more than one micron.

Silicon monoxide may be employed as such, and its use represents a simplified and preferable procedure. Effective results have also been obtained by substituting for the silicon monoxide a mixture of equimolar portions of elemental silicon and of silicon dioxide in the form of ground quartz, which evolves silicon monoxide vapor when heated in performing the process.

Crucible temperatures in the general range of 1000-2000° C. are applicable. Silicon monoxide ordinarily requires a temperature of at least about 1100° C. for evaporation at a useful rate, and somewhat higher temperatures, e. g. within the range of about 1300-1400° C., are preferred for operations conducted in a continuous manner and on a commercial scale.

As described, the process of this invention is particularly applicable to the surface treatment of "Mylar" polyester film, since this film has physical and chemical properties which make it particularly attractive as a tough backing or protective covering medium. However the process is also applicable to various other polymeric organic films which are initially non-receptive of printing inks, adhesives and other coatings. The treated materials are useful in a wide variety of products. Certain of these have already been mentioned; others include printed tapes, adhesive tapes, printed wrapping materials, and decal transfers.

Another illustrative article based on "Mylar" film treated as hereinbefore described and which has found wide commercial acceptance is a reflex reflective sheeting product of the type described in U. S. Patent No. 2,407,680 (September 17, 1946). As an example, the "Mylar" film, treated with silicon monoxide on one or both surfaces as hereinbefore described, is first coated on a treated surface with a mixture of small glass beads of high refractive index in a resinous binder composition comprising plasticized polyvinylbutyral resin and urea formaldehyde resin in solution in a volatile solvent, and aluminum vapor is then applied over the dried bead coat to provide a reflective coating. A suitable adhesive cement is next applied over the aluminum coated surface to provide a finished product which may be adhered to roadside signs or other surfaces and which provides a highly reflex-reflective surface covering. The same resinous binder, when applied to untreated "Mylar," is found to have substantially no adhesion thereto but instead flakes or peels away with ease. When coated on the treated "Mylar" surface, as above described, this same resinous binder adheres with great tenacity. Such reflex reflective film products have been applied to metal signs and exposed to outdoor weathering conditions for prolonged periods, and the treated "Mylar" film is found to be and to remain firmly and effectively bonded as a component of the reflective coating.

What is claimed is as follows:

1. A thin flexible organic polymer film having a normally non-ink-receptive surface which has been rendered ink-receptive by brief contact with silicon monoxide in vapor form.

2. A thin flexible organic polymer film having a normally non-ink-receptive surface which has been rendered ink-receptive by brief contact with silicon monoxide in vapor form.

3. A composite article of manufacture which includes a thin flexible organic polymer film having a normally non-ink-receptive surface which has been rendered ink-receptive by brief contact with silicon monoxide vapor, and an adherent functional coating bonded thereto.

4. A polyester film having a normaly non-ink-receptive surface which has been rendered ink-receptive by brief contact with silicon monoxide in vapor form.

5. A polyester film having a normally non-ink-receptive surface which has been rendered ink-receptive by brief contact with silicon monoxide in vapor form, and which has an ink imprint firmly bonded to the treated surface.

6. A thin transparent film of terephthalic acid-ethylene glycol condensation polymer having a normally non-ink-receptive surface which has been rendered ink-receptive by brief exposure in a high vacuum to silicon monoxide vapor.

7. A thin transparent film of terephthalic acid-ethylene glycol condensation polymer having a normally non-ink-receptive surface which has been rendered ink-receptive by brief exposure in a high vacuum to silicon monoxide vapor, and which has an ink imprint firmly bonded to the treated surface.

8. A composite article of manufacture which includes a thin flexible polyester film having a normally non-ink-receptive surface which has been rendered ink-receptive by brief contact with silicon monoxide vapor, and, adhered thereto, a coating of a resinous binder comprising plasticized polyvinylbutyral resin and urea formaldehyde resin.

References Cited in the file of this patent
UNITED STATES PATENTS

| | | |
|---|---|---|
| 2,382,432 | McManus et al. | Aug. 14, 1945 |
| 2,456,899 | Strong | Dec. 21, 1948 |
| 2,601,016 | Hendricks et al. | June 17, 1952 |